US011750299B2

(12) United States Patent
Fukumoto et al.

(10) Patent No.: US 11,750,299 B2
(45) Date of Patent: Sep. 5, 2023

(54) COMMUNICATION APPARATUS AND COMMUNICATION METHOD

(71) Applicant: NIPPON TELEGRAPH AND TELEPHONE CORPORATION, Tokyo (JP)

(72) Inventors: Hiroyuki Fukumoto, Musashino (JP); Yosuke Fujino, Musashino (JP); Marina Nakano, Musashino (JP); Kazunori Akabane, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 63 days.

(21) Appl. No.: 17/623,008

(22) PCT Filed: Jul. 1, 2019

(86) PCT No.: PCT/JP2019/026032
§ 371 (c)(1),
(2) Date: Dec. 27, 2021

(87) PCT Pub. No.: WO2021/001870
PCT Pub. Date: Jan. 7, 2021

(65) Prior Publication Data
US 2022/0271848 A1    Aug. 25, 2022

(51) Int. Cl.
*H04B 11/00*  (2006.01)
*H04B 13/02*  (2006.01)
(Continued)

(52) U.S. Cl.
CPC ............ *H04B 11/00* (2013.01); *H04B 13/02* (2013.01); *H04L 5/0048* (2013.01); *H04L 5/0082* (2013.01); *H04L 25/0202* (2013.01)

(58) Field of Classification Search
CPC ....... H04B 11/00; H04B 13/02; H04L 5/0048; H04L 5/0082; H04L 25/0202;
(Continued)

(56) References Cited

U.S. PATENT DOCUMENTS

2022/0014278 A1* 1/2022 Fujino ................. H04B 7/0617
2022/0271848 A1* 8/2022 Fukumoto ........... H04L 25/0202
(Continued)

FOREIGN PATENT DOCUMENTS

CN    103217706 B  *  3/2017  ............. G01S 11/14
EP      3859988 A4  *  7/2022  ............. H04B 11/00
(Continued)

OTHER PUBLICATIONS

Taro Aoki, "Development of Deep Sea Cruising Autonomous Underwater Vehicle", Bulletin of the University of Electro-Communications vol. 19, vol. 1, 2 Merger, pp. 7-17 (2006).
(Continued)

*Primary Examiner* — Daniel Pihulic
(74) *Attorney, Agent, or Firm* — Harness, Dickey & Pierce, P.L.C.

(57) ABSTRACT

A communication device includes a channel estimation unit configured to estimate an impulse response based on signals of sound waves received by each of a plurality of hydrophones, a long delay removal unit configured to remove a long-delay impulse response from the impulse response to generate a post-removal impulse response, a weighting factor calculation unit configured to calculate a weighting factor based on the post-removal impulse response, and a synthesizing unit configured to synthesize the signals received by each of the plurality of hydrophones based on the weighting factor.

8 Claims, 9 Drawing Sheets

(51) Int. Cl.
*H04L 5/00* (2006.01)
*H04L 25/02* (2006.01)

(58) Field of Classification Search
CPC ............... H04L 5/0023; H04L 25/0224; H04L 25/03019; H04L 25/0212
See application file for complete search history.

(56) References Cited

U.S. PATENT DOCUMENTS

| 2022/0321182 | A1* | 10/2022 | Nakano | ............... | H04B 7/0632 |
| 2022/0353009 | A1* | 11/2022 | Nakano | ............... | H04B 7/0413 |

FOREIGN PATENT DOCUMENTS

| JP | 7174302 B2 * | 11/2022 | ............. H04B 11/00 |
| WO | WO-2020105538 A1 * | 5/2020 | ............. H04B 11/00 |
| WO | WO-2021001870 A1 * | 1/2021 | ............. H04B 11/00 |
| WO | WO-2021029015 A1 * | 2/2021 | ........... H04B 7/0456 |
| WO | WO-2021059498 A1 * | 4/2021 | ........... H04B 7/0413 |

OTHER PUBLICATIONS

Shingo Yoshizawa et al., "Parallel Resampling of OFDM Signals for Fluctuating Doppler Shifts in Underwater Acoustic Communication", Hindawi Journal of Electrical and Computer Engineering, vol. 2018, Article ID 3579619, 11 pages.
David Falconer et al., "Frequency Domain Equalization for Single-Carrier Broadband Wireless Systems", IEEE Communications Magazine, Apr. 2002, vol. 40, No. 4, pp. 58-66.

* cited by examiner

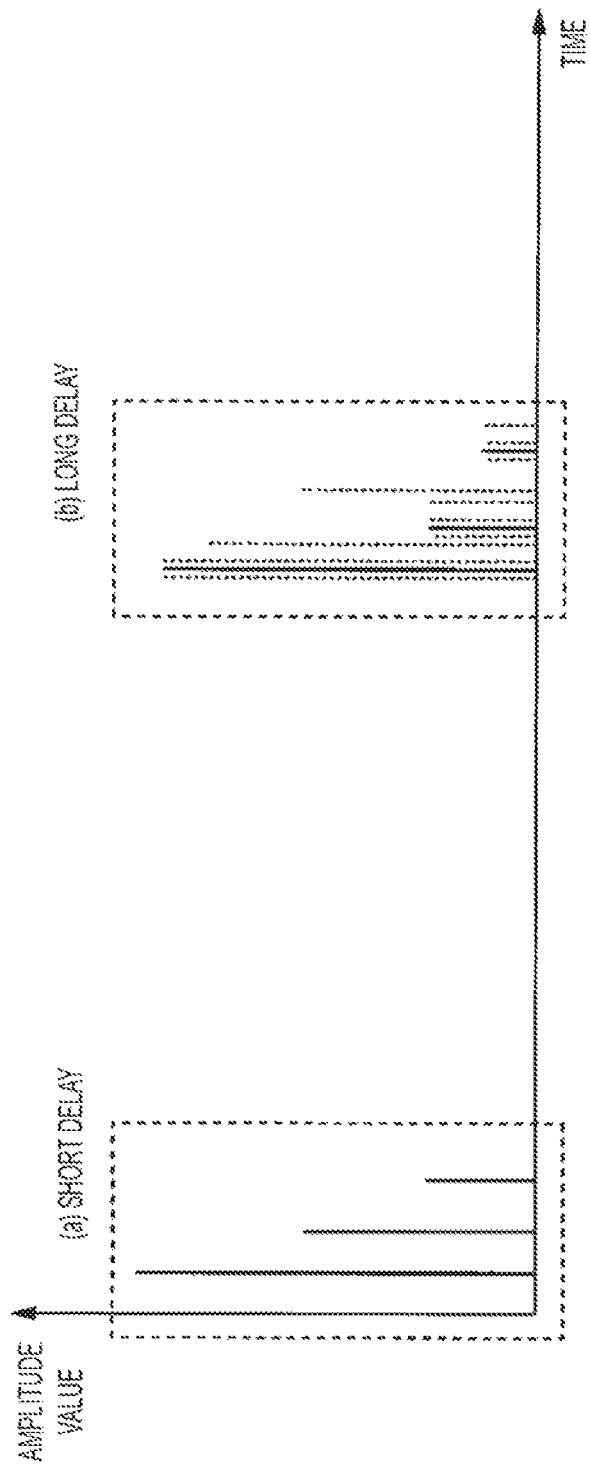

COMMUNICATION APPARATUS AND COMMUNICATION METHOD

CROSS-REFERENCE TO RELATED APPLICATIONS

This application is a 371 U.S. National Phase of International Application No. PCT/JP2019/026032, filed on Jul. 1, 2019. The entire disclosure of the above application is incorporated herein by reference.

TECHNICAL FIELD

The present invention relates to a communication apparatus and a communication method.

BACKGROUND ART

Underwater equipment, for example, unmanned underwater vehicles (IRA's) and underwater heavy equipment has been utilized in underwater resource explorations and constructions. To widen exploration areas and increase work efficiency, there has recently been an increasing need for a real-time video transmission technology and control technology that enable underwater equipment to be remotely controlled and autonomously navigate. In addition, a large-capacity wireless communication technology for shallow sea areas that support these technologies needs to be established.

Radio waves have poor reachability in the sea and a transmission distance is limited only to several centimeters. For this reason, ultrasonic waves are generally utilized in wireless communication in the sea. For example, the submersible "Urashima" of the Japan Agency for Marine-Earth Science and Technology (JAMSTEC) transmits images of deep sea areas to a support ship using ultrasound at a communication speed of up to 32 kbps (see Non Patent Literature 1).

However, received signals are severely distorted in the frequency and time directions in large-capacity acoustic communication performed in shallow sea areas, compared to acoustic communication performed in deep sea areas and wireless communication performed on land. The main causes of this distortion are long-delay multipath (multi-wave propagation) and the Doppler shift (Doppler effect). Further, the reason for the occurrence of the long-delay multipath is that the propagation speed of ultrasound is approximately 200,000 times slower than the propagation speed of radio waves. Acoustic communication in water is known to be simultaneously influenced by the random Doppler shift caused by wave fluctuations and by the Doppler shift caused by movements of underwater equipment. In particular, it is known that acoustic channels in the shallow sea are substantially influenced by the Doppler shifts (see Non Patent Literature 2).

FIG. 8 is a schematic diagram for describing a short delay and a long delay in underwater communication. In the water, for example, there are a short-delay multipath ((a) of FIG. 8) and a long-delay multipath ((b) of FIG. 8) as illustrated in FIG. 8. The short-delay multipath occurs, for example, due to reflection of direct waves and reflection around a receiver, or the like. On the other hand, the long-delay multipath occurs, for example, due to reflection on a sea surface, seabed, or the like. In addition, FIG. 9 is a diagram illustrating change in impulse responses of a short delay and a long delay in water. In FIG. 9, the vertical axis represents an amplitude value of the impulse responses and the horizontal axis represents time. While the amplitude value of the impulse response of the short delay changes relatively moderately ((a) of FIG. 9), the impulse response of the long delay changes at a high speed (e.g., with a delay of about several to dozens of milliseconds [ms]) ((b) of FIG. 9) as illustrated in FIG. 9 due to, for example, the fluctuation of the sea surface, or the like.

In the related art, as a method for compensating for distortion attributable to a long-delay multipath, for example, there is a compensation method in which an impulse response including a long delay is estimated in advance and equalized by multiplying an equalizer weight calculated based on the estimated value by a received signal (see Non Patent Literature 3). In general, in estimating an impulse response of a long-delayed wave including reflection on a sea surface, it is necessary to provide a training period that is longer than a delay amount of the long-delayed wave.

CITATION LIST

Non Patent Literature

Non Patent Literature 1: Taro Aoki, "Research and Development of Deep Sea Cruising Probe", Bulletin of the University of Electro-Communications, Vol. 19 (1-2 merged issue), pp. 7-17, August 2006.

Non Patent Literature 2: S. Yoshizawa, et. al., "Parallel Resampling of OFDM Signals for Fluctuating Doppler Shifts in Underwater Acoustic Communication", Journal of Electrical and Computer Engineering, Vol. 2018, Article ID 3579619, November 2018.

Non Patent Literature 3: D. Falconer, et al., "Frequency Domain Equalization for Single-Carrier Broadband Wireless Systems", IEEE Communications Magazine, Vol, 40, No. 4, pp. 58-66, April 2002.

SUMMARY OF THE INVENTION

Technical Problem

However, a fluctuating period of a sea surface is generally shorter than a training period. For this reason, an impulse response changes during training, and estimation accuracy, deteriorates. On the other hand, if the training period is shorter than a delay amount of a long-delayed wave, an impulse response of the long-delayed wave cannot be estimated. Therefore, in communication in shallow sea areas, it is difficult to perform signal processing to compensates for or mitigate distortion attributable to long-delayed waves based on the estimation result of the long-delayed waves. As a result, there is a problem that the communication quality cannot be stabilized.

The present invention has been conceived in consideration of the above-described circumstances, and aims to provide a technology that can provide stable communication quality.

Means for Solving the Problem

An aspect of the present invention is a communication device including a channel estimation unit configured to estimate an impulse response based on signals of sound waves received by each of a plurality of hydrophones, a long delay removal unit configured to remove a long-delay impulse response from the impulse response to generate a post-removal impulse response, a weighting factor calculation unit configured to calculate a weighting factor based on the post-removal impulse response, and a synthesizing unit configured to synthesize the signals received by each of the plurality of hydrophones based on the weighting factor.

In addition, an aspect of the present invention is a communication device including an adaptive filter unit configured to filter signals of sound waves received by each of a plurality of hydrophones, and synthesize the signals, and a weighting factor calculation unit configured to calculate, with a signal based on a known signal or an unknown signal as a training signal, an error between the signal and the training signal and to update a weighting factor to be used in filtering by the adaptive filter unit based on the error.

In addition, an aspect of the present invention is a communication method including estimating an impulse response based on signals of sound waves received by each of a plurality of hydrophones, removing a long-delay impulse response from the impulse response and generating a post-removal impulse response, calculating a weighting factor based on the post-removal impulse response, and synthesizing the signals received by each of the plurality of hydrophones based on the weighting factor.

In addition, an aspect of the present invention is a communication method including filtering signals of sound waves received by each of a plurality of hydrophones, and synthesizing the signals, filtering and synthesizing the signals received by each of the plurality of hydrophones, and calculating, with a signal based on a known signal or an unknown signal as a training signal, an error between the signal and the training signal and updating a weighting factor to be used in the filtering.

Effects of the Invention

The present invention can provide stable communication quality.

BRIEF DESCRIPTION OF DRAWINGS

FIG. 9 is a diagram illustrating changes in impulse responses of a short delay and a long delay in underwater communication.

DESCRIPTION OF EMBODIMENTS

First Embodiment

Hereinafter, a first embodiment of the present invention will be described with reference to the drawings.

Configuration of Acoustic Communication Device

Figure 1:
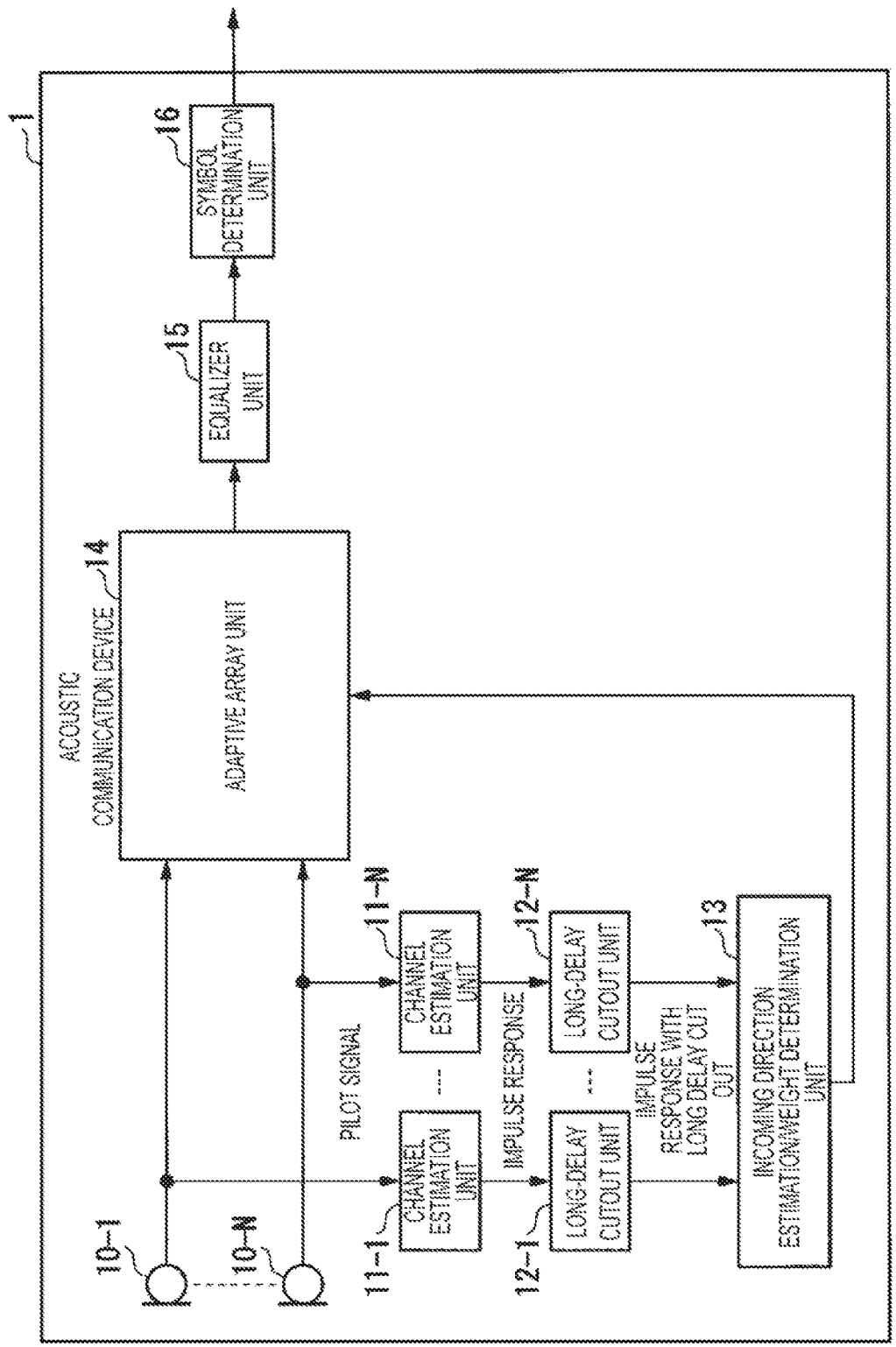
FIG. 1 is a block diagram illustrating a configuration of an acoustic communication device 1 according to a first embodiment of the present invention.

Hereinafter, a configuration of an acoustic communication device 1 (communication apparatus) will be described. A particular difference of the acoustic communication device 1 according to the present embodiment from a communication device including a common antenna is that a long-delay multipath is not estimated and the multipath is mitigated, FIG. 1 is a block diagram illustrating a configuration of the acoustic communication device 1 according to the first embodiment of the present invention. The acoustic communication device 1 includes N hydrophones (hydrophones 10-1 to 10-N), N channel estimation units (channel estimation units 11-1 to 11-N), N long-delay cutout units (long-delay cutout units 12-1 to 12-N), an incoming direction estimation/weight determination unit 13, an adaptive array unit 14, an equalizer unit 15, and a symbol determination unit 16 as illustrated in FIG. 1. Further, the value N described above is arbitrary.

Each of the hydrophones 10-1 to 10-N (which will be referred to as a "hydrophone 10" below if there is no need to describe them separately) includes a microphone (hydrophone) that is capable of capturing ultrasonic audio signals in water. The hydrophones 10-1 to 10-N output the captured audio signals (hereinafter referred to as "received signals") to the adaptive array unit 11.

In addition, the hydrophones 10 extract pilot signals from the received signals. Further, a pilot signal is a signal in a pattern defined in advance between transmission and reception sides. The hydrophones 10-1 to 10-N output the extracted pilot signals to the channel estimation units 114 to 11-N, respectively.

Further, a configuration in which a carrier regeneration process, a symbol timing synchronization process, a Doppler shift compensation process, and the like are performed prior to the pilot signal extraction process may be adopted.

The channel estimation units 11-1 to 11-N (which will be referred to as a "channel estimation unit 11" below if there is no need to describe them separately) acquire the pilot signals output from the hydrophones 10-1 to 10-N, respectively. The channel estimation units 11 estimate impulse responses based on the acquired pilot signals. The channel estimation units 11-1 to 11-N output the estimated impulse responses to the long-delay cutout units 12-1 to 12-N, respectively.

The long-delay cutout units 12-1 to 12-N (which will be referred to as a "long-delay cutout unit 12" if there is no need to describe them separately) acquire the impulse responses output from the channel estimation units 11-1 to 11-N, respectively. The long-delay cutout units 12 replace the amplitude values of the impulse responses that have arrived at a time later than a time $T_0$, which is a preset time, with zero. This causes the impulse responses acquired by the long-delay cutout units 12 to be impulse responses with a long delay cut out. The long-delay cutout units 12 output the impulse responses with a long delay cut out to the incoming direction estimation/weight determination unit 13.

Figure 2:
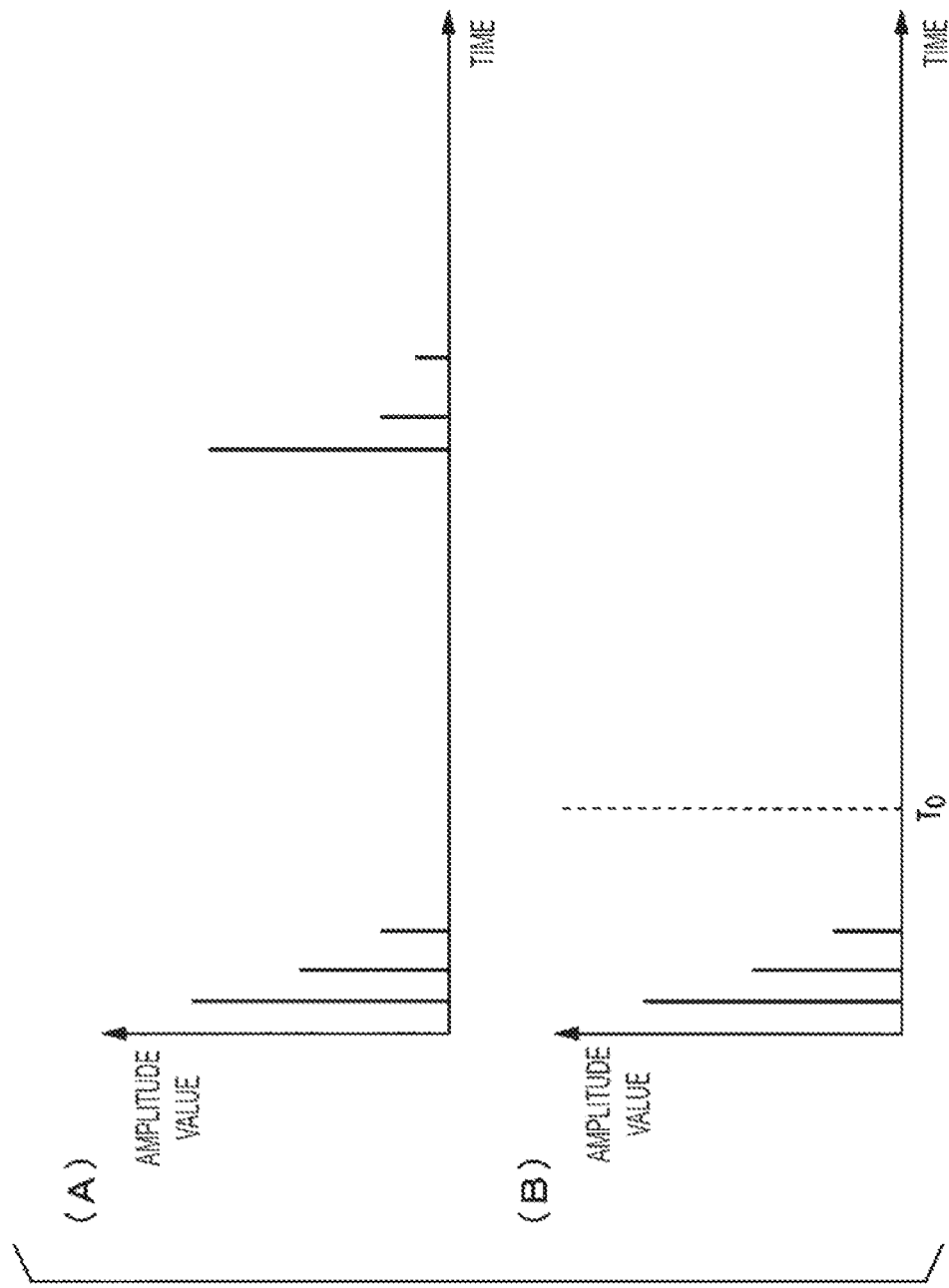
FIG. 2 is a schematic diagram for explaining processing performed by a long-delay cutout unit 12 according to the first embodiment of the present invention.

FIG. 2 is a schematic diagram for explaining processing performed by a long-delay cutout unit 12 according to the first embodiment of the present invention. In (A) and (B) of FIG. 2, the vertical axis represents an amplitude value of an impulse response, and the horizontal axis represents time. (A) of FIG. 2 illustrates an example of an impulse response input to the long-delay cutout unit 12. In addition, (B) of FIG. 2 illustrates an example of an impulse response output from the long-delay cutout unit 12. As can be seen by comparing (A) and (B) of FIG. 2, the long-delay cutout unit 12 replaces the amplitude of the impulse response from the time $T_0$ with zero.

Due to the above-described amplitude value replacement process by the long-delay cutout unit 12, a direct wave or a short-delay multipath caused by the direct wave (i.e., an incoming wave with an incoming time before the time $T_0$ (incoming time $\leq T_0$)) is separated from a long-delay multipath caused by, for example, sea surface reflection and seabed reflection (i.e., an incoming wave with an incoming time after the time $T_0$ (incoming time $> T_0$)).

Further, the time $T_0$ may be geometrically determined based on a distance between transmission and reception sides and depth information or may be determined based on an incoming time of a reflected wave. Alternatively, the time $T_0$ may be determined based on an incoming time of a second peak among the impulse responses estimated by the channel estimation units 11, the second peak arriving after a first peak (i.e., a direct wave), the second peak having an amplitude value equal to or greater than a predetermined value, for example.

Further, in a case in which a length of the pilot signal used in the channel estimation by the channel estimation unit 11 is shorter than the length from a time 0 to the time $T_0$, the long-delay cutout units 12 may output the impulse responses acquired from the channel estimation units 11 to the incoming direction estimation/weight determination unit 13 without change.

The description will continue with reference back to FIG. 1. The incoming direction estimation/weight determination unit 13 acquires the impulse responses with the long delay cut out (i.e., impulse responses only constituted by the incoming wave with an incoming time before the time $T_0$) output from each of the long-delay cutout units 12-1 to 12-N. The incoming direction estimation/weight determination unit 13 estimates the incoming direction of the received signals based on the impulse responses with the long delay cut out. The incoming direction estimation/weight determination unit 13 determines a weight (a weighting factor) to be used in the process by the adaptive array unit 14 in the subsequent stage based on the result of the estimation of the incoming direction. The incoming direction estimation/weight determination unit 13 outputs information indicating the determined weight to the adaptive array unit 14.

Further, the weight may be determined according to a rule, for example, maximum ratio synthesis. The weighting process using the weight is set such that an orientation method of an adaptive array faces the incoming direction of the short delay. Alternatively, if the long delay can be estimated, beamforming to perform null formation in the incoming direction of the long delay (i.e., the incoming wave with an incoming time after the time $T_0$ (incoming time $> T_0$)) may be adopted.

The adaptive array unit 14 acquires each of the received signals output from the hydrophones 10-1 to 10-N. In addition, the adaptive array unit 14 acquires information indicating the weight output from the incoming direction estimation/weight determination unit 13. The adaptive array unit 14 multiplies the acquired received signals by the acquired weight. The adaptive array unit 14 outputs the received signals that have been multiplied by the weight to the equalizer unit 15.

The process of multiplying the received signals by the weight emphasizes the direct wave and the short-delay multipath caused by the direct wave. As a result, the acoustic communication device 1 according to the present embodiment can mitigate the long-delay multipath without estimating the long-delay multipath.

The equalizer unit 15 acquires the received signals multiplied by the weight output from the adaptive array unit 14. The equalizer unit 15 equalizes the acquired received signals with the residual direct wave and short-delay multipath caused by the direct wave. The equalizer unit 15 outputs the equalized received signals to the symbol determination unit 16.

The symbol determination unit 16 acquires the received signals output from the equalizer unit 15. The symbol determination unit 16 performs symbol determination on the acquired received signals.

With the configuration as described above, the acoustic communication device 1 according to the first embodiment of the present invention can reduce interference caused by the long-delay multipath without estimating the long-delay multipath by emphasizing the short-delay received signals including the direct wave.

Operation of Acoustic Communication Device

An example of an operation performed by the acoustic communication device 1 will be described below.

Figure 3:
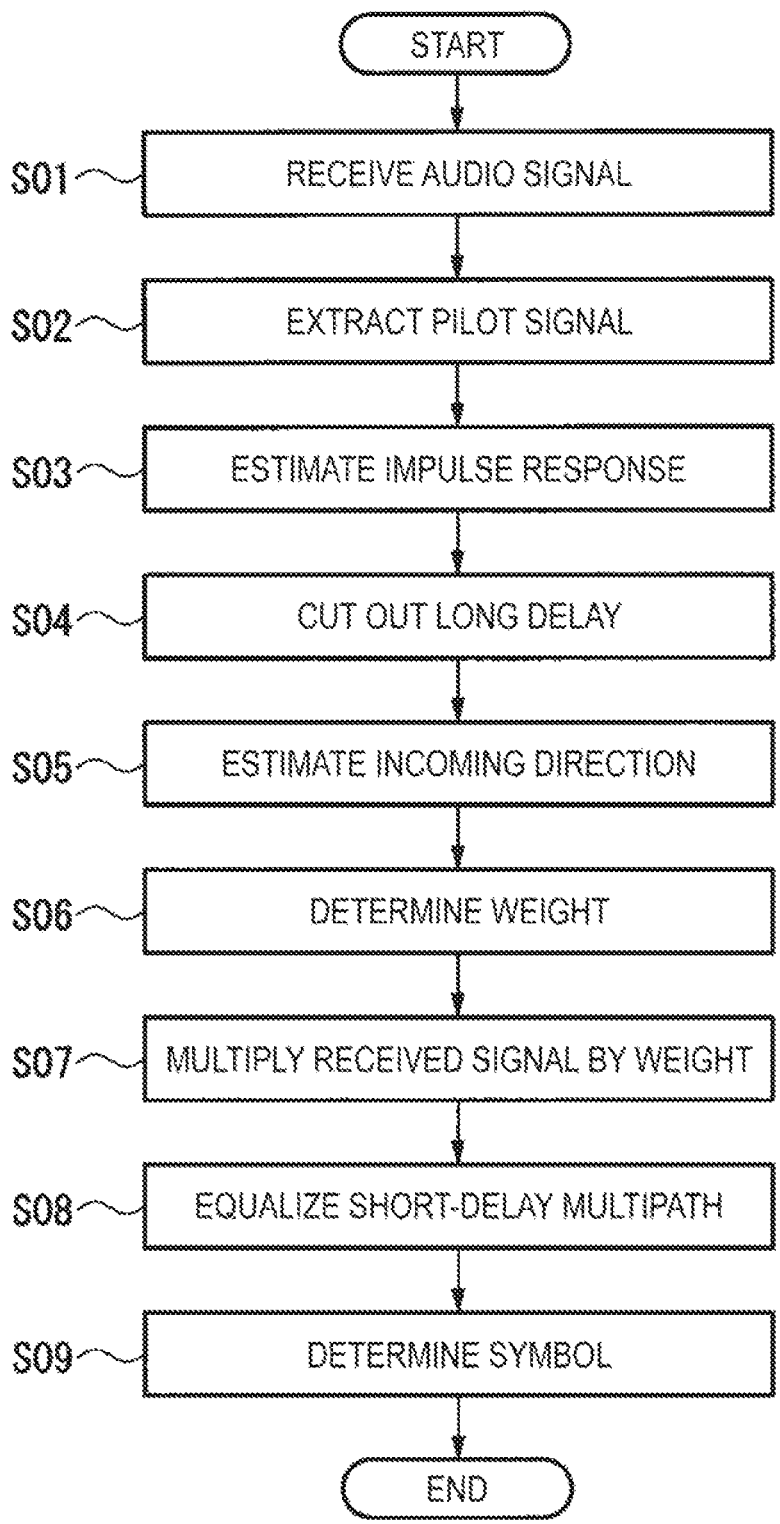
FIG. 3 is a flowchart illustrating an operation of the acoustic communication device 1 according to the first embodiment of the present invention.

FIG. 3 is a flowchart illustrating an operation of the acoustic communication device 1 according to the first embodiment of the present invention.

The hydrophone 10 receives an ultrasonic audio signal in water (step S01). The hydrophone 10 extracts a pilot signal from the received signal (step S02).

The channel estimation unit 11 estimates an impulse response based on the extracted pilot signal (step S03), The long-delay cutout unit 12 cuts out a long delay from the estimated impulse response (step S04), Specifically, the long-delay cutout unit 12 replaces the amplitude value of the impulse response incoming at a time after the time $T_0$, which is a preset time, with zero.

The incoming direction estimation/weight determination unit 13 estimates an incoming direction or the like based on the impulse response with the long delay cut out (step SOS). The incoming direction estimation/weight determination unit 13 determines a weight (a weighting factor) to be used in the process by the adaptive array unit 14 in the subsequent stage based on the result of the estimation of the incoming direction (step S06).

The adaptive array unit 14 multiplies the received signal acquired from the hydrophone 10 by the weight (step S07). The equalizer unit 15 equalizes the received signal multiplied by the weight with a residual direct wave and a short-delay multipath caused by the direct wave (step S08).

The symbol determination unit 16 performs symbol determination on the received signal acquired from the equalizer unit 15 (step S09).

With this process, the operation of the acoustic communication device 1 illustrated in the flowchart of FIG. 3 ends.

As described above, the acoustic communication device 1 (communication device) according to the first embodiment of the present invention can estimate only an impulse response of a relatively slowly changing direct wave by separating a long-delay multipath wave from the direct wave. In addition, the acoustic communication device 1 mitigates long-delayed reflected waves having a signal in which the estimated response of the direct wave and a training sequence are convoluted as a training signal and using the adaptive array to direct the directivity of an antenna in the incoming direction of direct waves.

As a result, the acoustic communication device 1 can effectively mitigate the long-delay multipath without estimating the long-delay multipath and provide stable communication quality in, for example, shallow sea areas.

Modified Example of First Embodiment

In the first embodiment described above, it is assumed that the acoustic communication device 1 receives a single stream of received signals. On the other hand, an acoustic communication device 1*b* (communication apparatus) according to a modified example of the first embodiment which will be described below is a communication device in a spatial multiplex transmission system.

Configuration of Acoustic Communication Device

Hereinafter, a configuration of the acoustic communication device 1*b* will be described. The acoustic communication device 1*b* according to the modified example of the first embodiment is particularly different from a communication device equipped with a common array antenna in that a long-delay multipath can be mitigated without estimating the multipath, similarly to the first embodiment.

Figure 4:
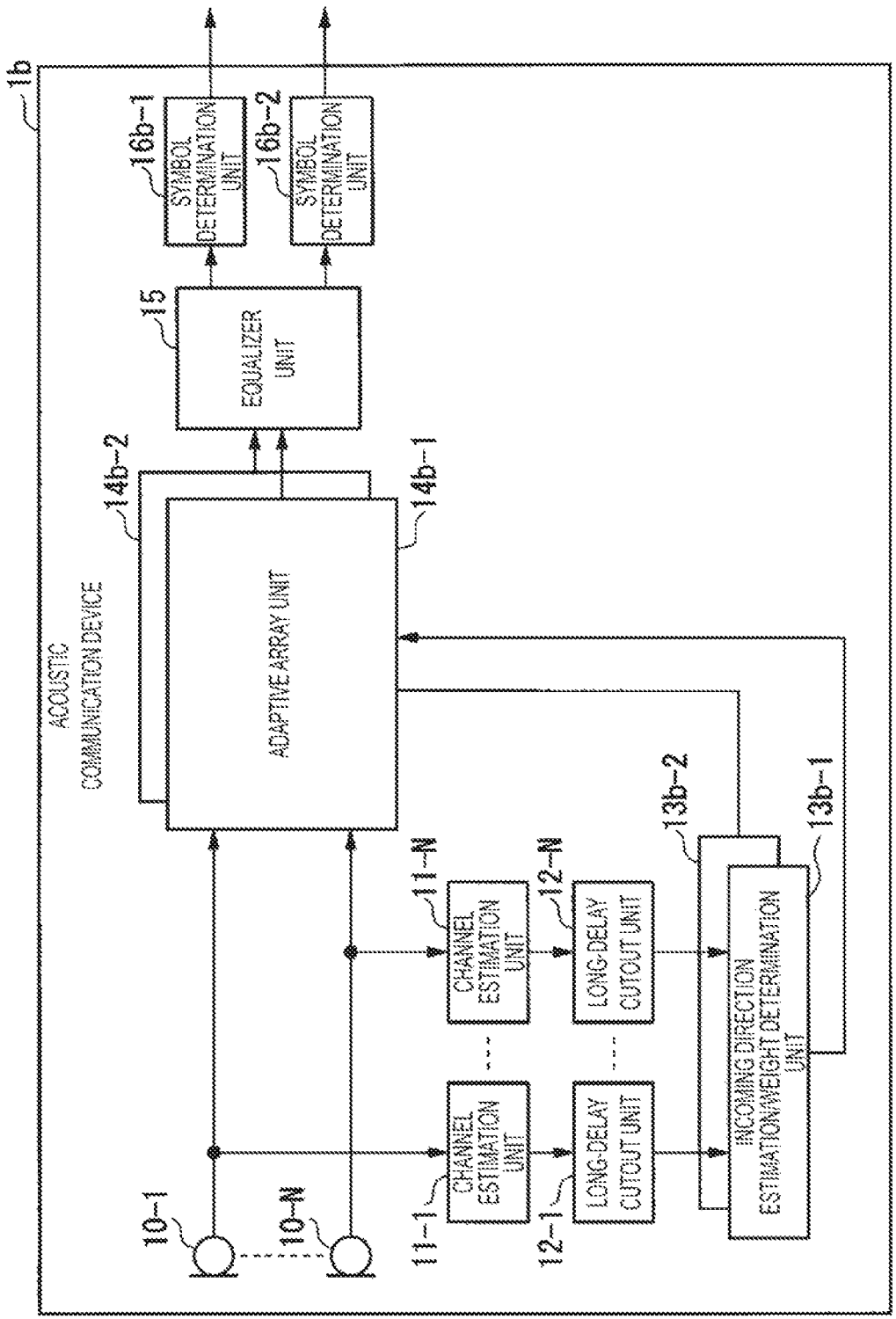
FIG. 4 is a block diagram illustrating a configuration of an acoustic communication device 1b according to a modified example of the first embodiment of the present invention.

FIG. 4 is a block diagram illustrating a configuration of the acoustic communication device 1*b* according to the modified example of the first embodiment of the present invention. The acoustic communication device 1*b* includes N hydrophones (hydrophones 10-1 to 10-N), N channel estimation units (channel estimation units 11-1 to 11-N), N long-delay cutout units (long-delay cutout units 12-1 to 12-N), two incoming direction estimation/weight determination units (incoming direction estimation/weight determination units 13*b*-1 and 13*b*-2), two adaptive array units (adaptive array units 14*b*-1 and 14*b*-2), an equalizer unit 15, and two symbol determination units (symbol determination units 16*b*-1 and 16*b*-2) as illustrated in FIG. 4. Further, the value N described above is arbitrary.

Further, the same functional blocks as the functions of the acoustic communication device 1 according to the first embodiment are denoted by the same reference numerals. In addition, different configurations from those of the first embodiment will be mainly described.

Hereinafter, the incoming direction estimation/weight determination units 11*b*-1 and 11*b*-2, the adaptive array units 14*b*-1 and 14*b*-2, and the symbol determination units 16*b*-1 and 161-2 will be referred to as the "incoming direction estimation/weight determination unit 13*b*", the "adaptive array unit 141", and the "symbol determining unit 16*b*" if there is no need to describe them separately.

Further, the acoustic communication device 1*b* includes the same number of incoming direction estimation/weight determination units 13*b*, adaptive array units 14*b*, and symbol determination units 161 as the number of spatially multiplexed streams. In the modified example of the first embodiment, it is assumed as an example that the number of channels is two. As a result, the acoustic communication device 1*b* according to the modified example of the first embodiment has two each of the incoming direction estimation/weight determination units 13*b*, adaptive array units 14*b*, and symbol determination units 16*b* as illustrated in FIG. 4.

The channel estimation unit 11 estimates an impulse response for all channels formed by the hydrophones of a transmitter and the hydrophones (hydrophones 10) of a receiver.

The incoming direction estimation/weight determination unit 13 determines a weight (weighting factor) to be used in a process by the adaptive array unit 14 in the subsequent stage so that the stream of received signals to be demodulated is equalized based on the impulse response with the long delay cut out that has been output from the long-delay cutout unit 12. This mitigates interference of the long delay and equalizes interference with other streams.

The adaptive array units 14*b*-1 and 14*b*-2 acquire information indicating the weight output from each of the incoming direction estimation/weight determination units 13*b*-1 and 13*b*-2. The adaptive array unit 14*b* multiplies the received signals acquired from the hydrophones 10 by the acquired weight. In this way, the received signal is weighted for each stream.

The equalizer unit 15 acquires the received signals multiplied by the weight output from the adaptive array unit 1411. The equalizer unit 15 removes residual direct waves and a short-delay multipath caused by the direct waves to separate the stream from them. The equalizer unit 15 outputs the separated stream to the symbol determination units 16*b*-1 and 16*b*-2.

The symbol determination unit 16 performs symbol determination on the received signals output from the equalizer unit 15.

With the configuration as described above, in the acoustic communication device 1*b* according to the modified example of the first embodiment of the present invention, the long-delay multipath can be mitigated without estimating the multipath even in communication using multiple-input and multiple-output (MIMO), fir example.

Second Embodiment

Hereinafter, a second embodiment of the present invention will be described with reference to the drawings.

Configuration of Acoustic Communication Device

Hereinafter, a configuration of an acoustic communication device 1 will be described. The acoustic communication device 1*c* (communication apparatus) according to the second embodiment differs from the acoustic communication device 1 according to the first embodiment described above in that the acoustic communication device 1*c* can follow a fast-changing long delay by adaptively changing a weight on a received signal by the adaptive array unit 14. The acoustic communication device 1*c* according to the second embodiment can be adapted to change in behaviors of a long delay (i.e., movement of a communication device in water, environmental change attributable to fluctuations in a sea surface, etc.) by sequentially updating the directivity of the adaptive array depending on the environment.

Figure 5:
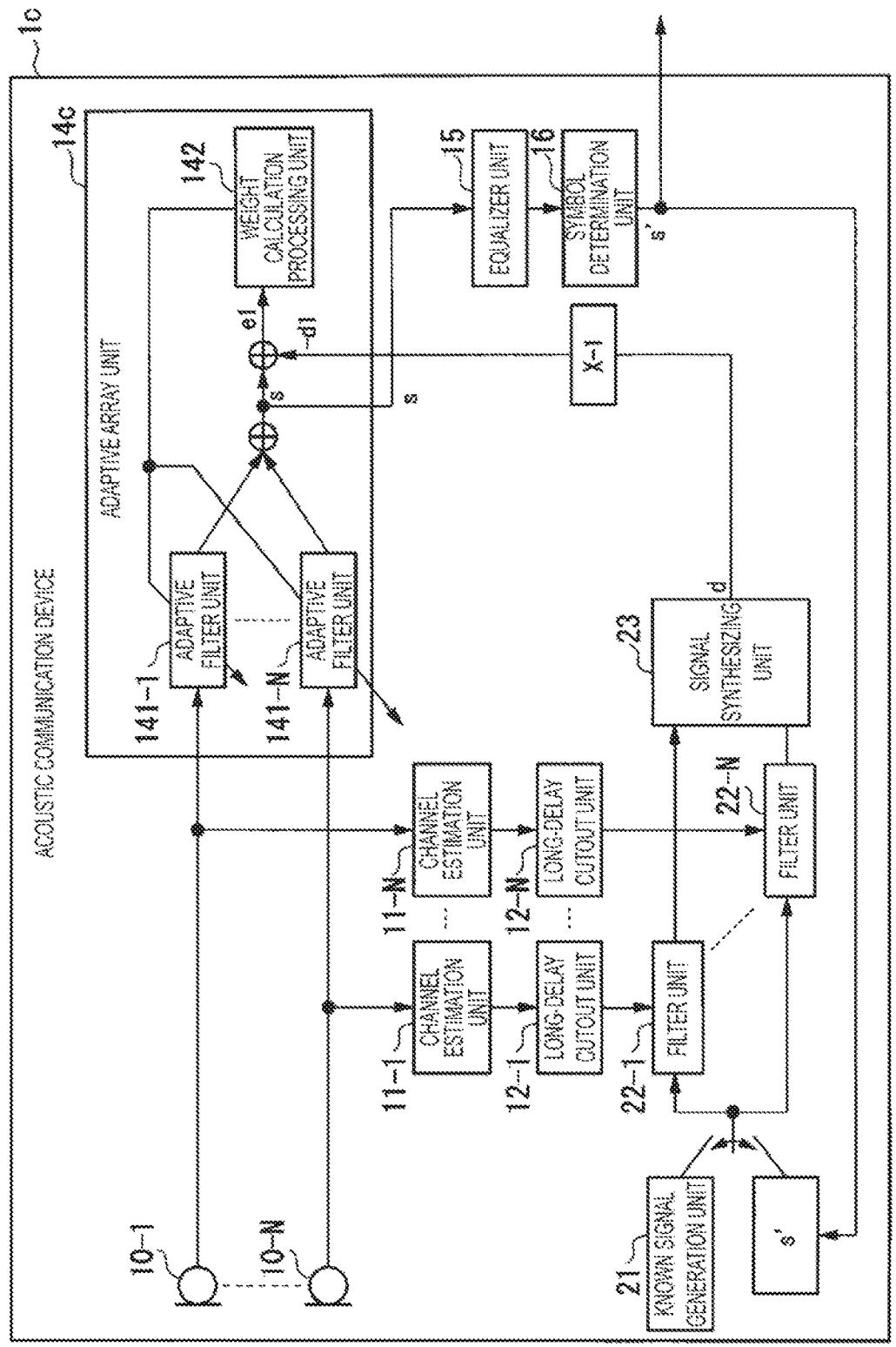
FIG. 5 is a block diagram illustrating a configuration of an acoustic communication device 1c according to a second embodiment of the present invention.

FIG. 5 is a block diagram illustrating a configuration of the acoustic communication device 1*c* according to the second embodiment of the present invention. The acoustic communication device 1*c* includes N hydrophones (hydrophones 10-1 to 10-N), N channel estimation units (channel estimation units 11-1 to 11-N), N long-delay cutout units (long-delay cutout units 12-1 to 12-N), an adaptive array unit 14*c*, an equalizer unit 15, and a symbol determination unit 16, a known signal generation unit 21, N filter units (filter units 22-1 to 22-N), and a signal synthesizing unit 23 as illustrated in FIG. 5. Further-, the value N described above is arbitrary.

In addition, the adaptive array unit 14c includes N adaptive filters (adaptive filter units 141-1 to 141-N) and a weight calculation processing unit 142 as illustrated in FIG. 5.

Hereinafter, the filter units 22-1 to 22-N and the adaptive filter units 141-1 to 141-N will be simply referred to as a "filter unit 22" and an "adaptive filter unit 141", respectively, if there is no need to describe them separately.

The acoustic communication device is according to the second embodiment equalizes a multipath in two stages. The acoustic communication device 1c includes the adaptive array unit 14c that mitigate a long delay and the equalizer unit 15 that is installed after the adaptive array unit 14c and equalizes a short delay. The acoustic communication device 1c updates the weight to be used by the adaptive array unit 14c that mitigates the long delay to adaptively remove the long-delay multipath.

The filter unit 22 is a finite impulse response (FIR) filter with an impulse response output from the long-delay cutout unit 12 that has a long delay cut (i.e., an impulse response only including an incoming wave with an incoming time before a time $T_0$) as a weighting factor. The weighting factor mentioned here is, for example, a tap coefficient of the filter. The filter unit 22 sets a known signal or an unknown signal s' after symbol determination as a training signal and performs filtering on the known signal or the training signal s'. The filter unit 22 outputs the filtered signal to the signal synthesizing unit 23.

That is, the signal output from the filter unit 22 is a signal in which the impulse response output from the long-delay cutout unit 12 with the long delay cut out and the transmitted signal are convoluted. Thus, the signal output from filter unit 22 is a signal that has passed through a direct wave and a short-delay multipath channel caused by the direct wave (i.e., the impulse response only including the incoming wave with the incoming time before the time $T_0$).

The signal synthesizing unit 23 synthesizes the signal output from the filter unit 22 based on any rule, for example, maximum ratio synthesis. The signal synthesizing unit 23 outputs the synthesized signal d to the adaptive array unit 14c. Further, the maximum ratio synthesis in the signal synthesizing unit 23 refers to directing a beam in an incoming direction of a direct wave and a short-delay caused by the direct wave. Further, the signal d output from the signal synthesizing unit 23 is a training signal for the adaptive array unit 14c.

The adaptive array unit 14c converges the weight by adaptively repeating filtering based on the acquired training signal (the signal d), As described above, the adaptive array unit 14c includes an adaptive filter unit 141 and a weight calculation processing unit 142. The received signals received by the hydrophones 10-1 to 10-N pass through each of the adaptive filter units 141-1 to 141-N. The adaptive array unit 14c generates a signals by simply adding the signals that have passed through each of the adaptive filter units 141-1 to 141-N, The adaptive array unit 14e calculates the difference between the signal s and the training signal d and evaluates an error e1.

The weight calculation processing unit 142 updates the adaptive filter unit 141 in the gradient direction with an error going to zero, based on the error e1. Further, the calculation of the weight performed by the weight calculation processing unit 142 may employ, for example, a least mean square (LMS) algorithm, a recursive least square (RLS) algorithm or another optimization algorithm.

Here, when the error between the training signal d and the signal s which is the sum of the signals output by the adaptive filter units 141 is at the minimum, the output of the channel configured by the direct wave and the short-delay multipath caused by the direct wave (signal (1) best matches the output of the adaptive filter units 141 (signal s). That is, in this case, the longest-delayed reflected wave is mitigated in the signal output from the adaptive array unit 14.

Further, the adaptive filter units 141 may be updated during the training signal reception period, and a fixed weight may be used during a subsequent payload reception period. Alternatively, the adaptive filter units 141 may be sequentially updated in a channel on which the incoming direction of the reflected wave varies in time with the unknown signal s' after the symbol determination input to the filter unit 22 and the signal obtained via the signal synthesizing unit 23 used as a training signal d.

In addition, the number of taps of the adaptive filter unit 141 may be a preset value or $T_0$. In addition, an initial value of the adaptive filter unit 141 may also be a value based on the weight calculated from the impulse response with the long delay cut out output from the long-delay cutout unit 12.

The equalizer unit 15 removes the residual direct wave or the short-delay multipath caused by the direct wave from the signal s output from the adaptive array unit 14c.

The symbol determination unit 16 performs symbol determination on the received signal output from the equalizer unit 15.

As described above, the acoustic communication device 1c according to the second embodiment of the present invention can estimate only the impulse response of the relatively slowly changing direct wave by separating the long-delay multipath wave from the direct wave. In addition, the acoustic communication device 1c mitigates long-delayed reflected waves having a signal based on a known signal or an unknown signal s' as a training signal and using the adaptive array to direct the directivity of an antenna in the incoming direction of the direct waves.

As a result, the acoustic communication device 1c can effectively mitigate the long-delay multipath without estimating the long-delay multipath and provide stable communication quality in, for example, shallow sea areas.

In addition, the acoustic communication device 1c can adaptively change the weight on the received signal as described above. Thus, by sequentially updating the directivity of the adaptive array in accordance with the environment, the acoustic communication device 1c can also follow fluctuations in a fast-changing long delay.

Modified Example of Second Embodiment

In the second embodiment described above, it is assumed that the acoustic communication device 1c receives a single stream of received signals. On the other hand, an acoustic communication device 1d (communication apparatus) according to a modified example of the second embodiment which will be described below is a communication device in a spatial multiplex transmission system. Different configurations from those of the second embodiment will be mainly described below.

Configuration of Acoustic Communication Device

Figure 6:
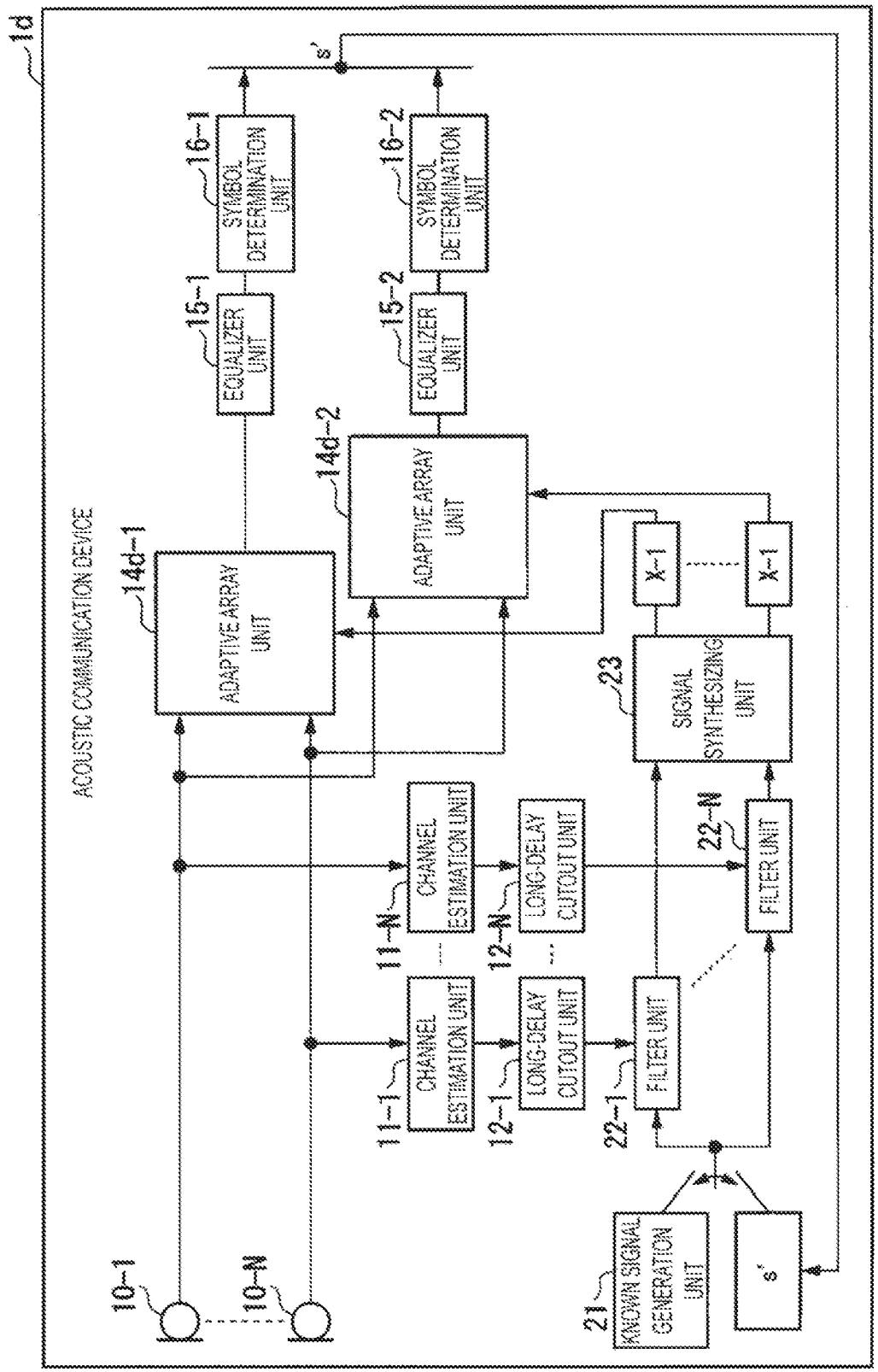
FIG. 6 is a block diagram illustrating a configuration of an acoustic communication device 1d according to a modified example of the second embodiment of the present invention.

Hereinafter, a configuration of the acoustic communication device 1d will be described. FIG. 6 is a block diagram illustrating a configuration of the acoustic communication device 1d according to a modified example of the second embodiment of the present invention. The acoustic communication device 1d includes N hydrophones (hydrophones 10-1 to 10-N), N channel estimation units (channel estimation units 11-1 to 11-N), N long-delay cutout units (long-delay cutout units 12-1 to 12-IN), two adaptive array units (adaptive array units 14d-1 and 14d-2), two equalizer units (equalizer units 15-1 and 15-2), and two symbol determination units (symbol determination units 16-1 and 16-2), a known signal generation unit 21, N filter units (filter units 22-1 to 22-N), and a signal synthesizing unit 23 as illustrated in FIG. 6. Further, the value N described above is arbitrary.

Hereinafter, the adaptive array units 14d-1 to 14d-2, the equalizer units 15-1 and 15-2, and the symbol determination units 16-1 and 16-2 will be referred to simply as an "adaptive array unit 14d", an "equalizer unit 15", and a "symbol determination unit 16" of there is no need to describe them separately.

The channel estimation unit 11 estimates an impulse response for all channels formed by the hydrophones of a transmitter- and the hydrophones (hydrophones 10) of a receiver.

The filter unit 22 convolutes an impulse response with a long delay cut out output from the long-delay cutout unit 12 with respect to a spatially multiplexed stream.

Further, the acoustic communication device 1d includes the same number of adaptive array units 14d, equalizer units 15, and symbol determination units 16 as the number of spatially multiplexed streams. In the modified example of the second embodiment, it is assumed as an example that the number of spatially multiplexed streams is two. As a result, the acoustic communication device 1d according to the modified example of the second embodiment has two each of the adaptive array units 14d, the equalizer units 15, and the symbol determination units 16 as illustrated in FIG. 6.

All of the configurations of the adaptive array units 14d-1 and 14d-2 are the same as the configuration of the adaptive array 14c of the acoustic communication device 1c according to the second embodiment described above. The adaptive array unit 14d updates a weight using, for example, an RLS algorithm, an LMS algorithm, or the like with a signal output from the signal synthesizing unit 23 as a training signal. Then, the adaptive array unit 14d weighs and combines received signals for each stream.

The equalizer unit 15 removes a residual direct wave or a short-delay multipath caused by the direct wave from the signal output from the adaptive array unit 14d.

The symbol determination unit 16 performs symbol determination on the received signal output from the equalizer unit 15.

With the configuration as described above, in the acoustic communication device 1d according to the modified example of the second embodiment of the present invention, a long-delay multipath can be mitigated without estimating the multipath even in communication using (MIMO), or the like, for example.

Third Embodiment

Hereinafter, a third embodiment of the present invention will be described with reference to the drawings. In the present embodiment, an equalizer unit 15e is configured by an adaptive filter-. As a result, an acoustic communication device according to the third embodiment can also follow fluctuations in the short-delay multipath remaining in a signal output from an adaptive array unit. As a result, the equalizer unit 15e can equalize signals even in an environment in which, for example, the behavior of a short-delay multipath changes at a high speed as equipment moves in water at a high speed.

Configuration of Equalizer Unit

Hereinafter, a configuration of the equalizer unit 15e will be described.

Figure 7:
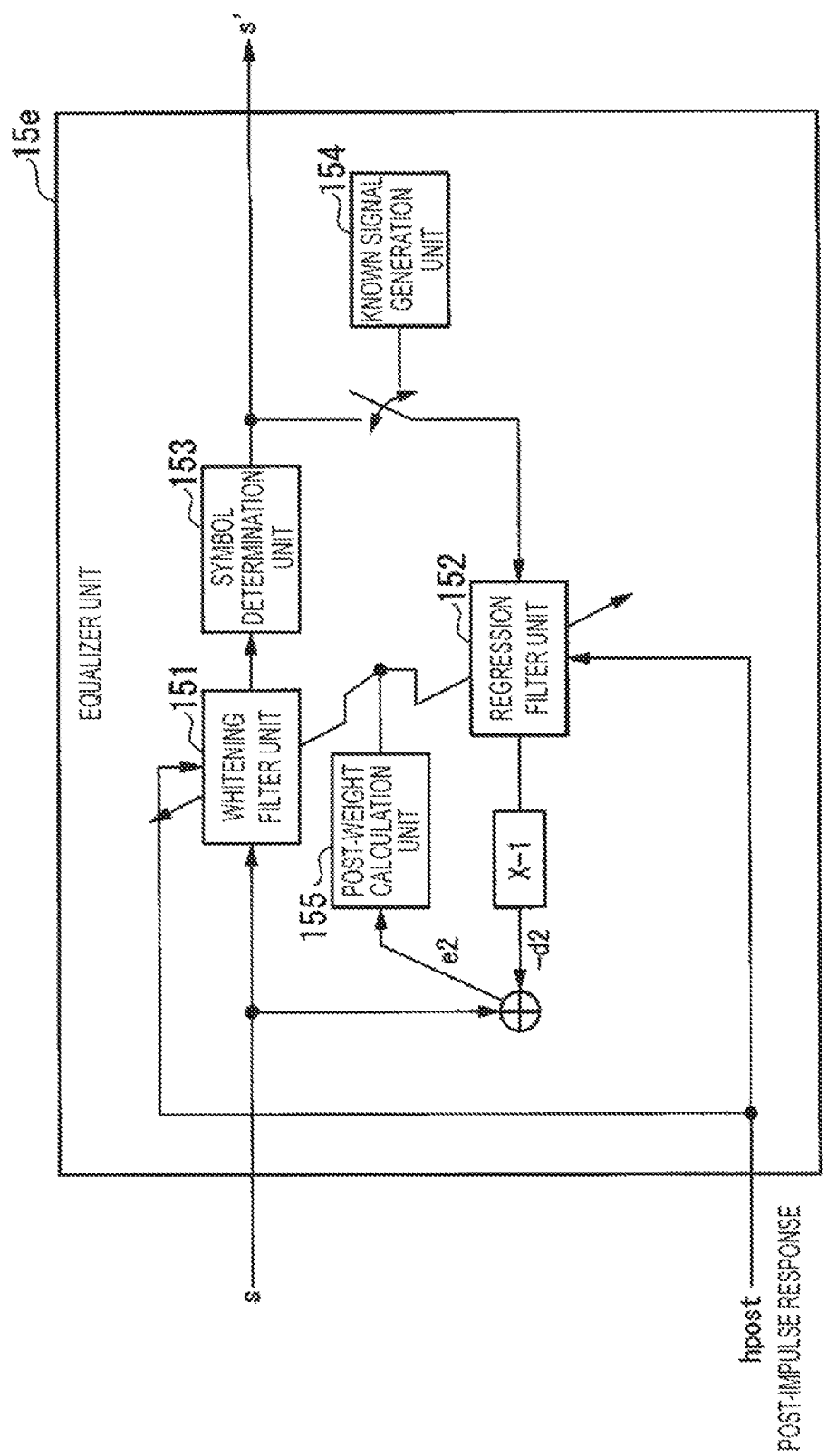
FIG. 7 is a block diagram illustrating a configuration of an equalizer unit 15e according to a third embodiment of the present invention.
Figure 8:
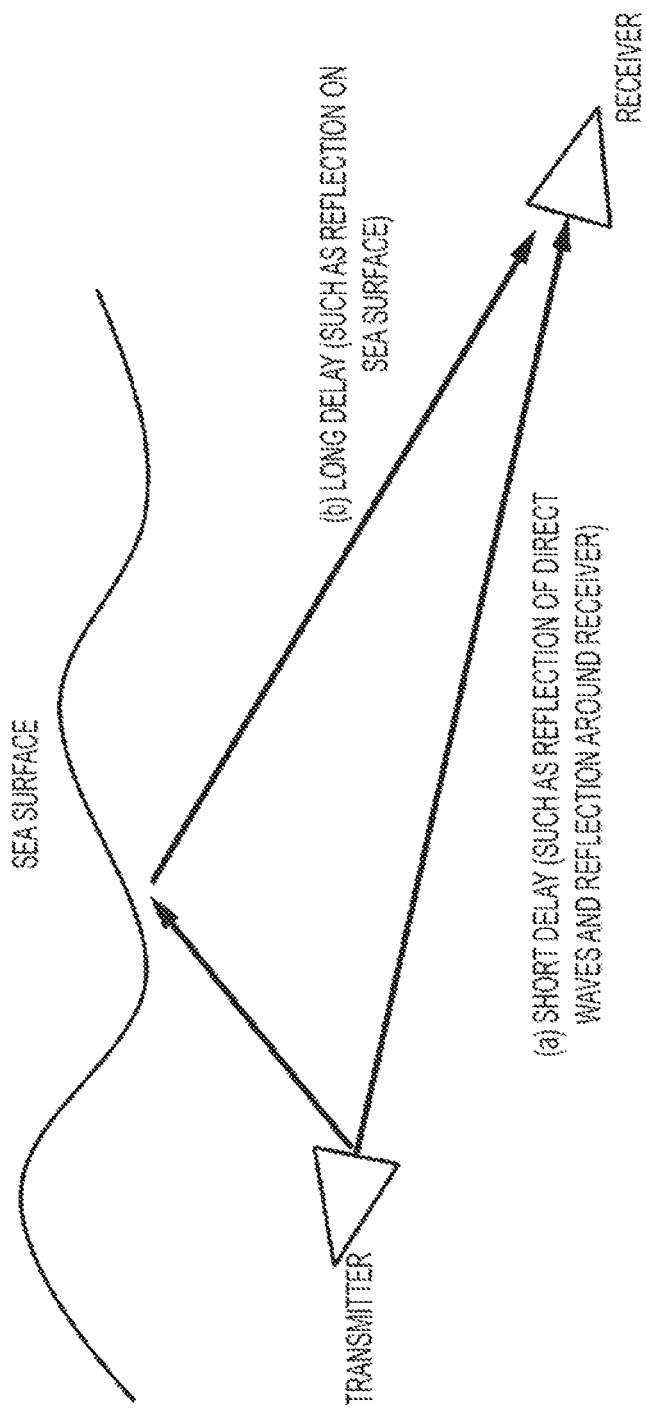
FIG. 8 is a schematic diagram for explaining a short delay and a long delay in underwater communication.

FIG. 7 is a block diagram illustrating a configuration of the equalizer unit 15e according to the third embodiment of the present invention. Hereinafter, differences from the equalizer unit 15 according to the above-described embodiment will be described.

The equalizer unit 15e includes a whitening filter unit 151, a regression filter unit 152, a symbol determination unit 153, a known signal generation unit 154, and a post-weight calculation processing unit 155 as illustrated in FIG. 7.

A signal s output from an adaptive array unit (not illustrated) is input to each of the whitening filter unit 151 and the feedback-type regression filter unit 152 of the equalizer unit 15e, Further, for initial values of the whitening filter unit 151 and the regression filter unit 152, a post-impulse response hpost in which a channel response is again estimated based on a signal output from a signal synthesizing unit (not illustrated) is set.

The signal s recovers a symbol point through the whitening filter unit 151. The whitening filter unit 151 is an uncorrelated filter. The whitening filter unit 151 may be a filter according to a rule, for example, a minimum mean square error (MMSE).

The symbol determination unit 153 makes forced determination on the recovered signal point. For example, in a case in which a signal is transmitted in a binary phase shift keying (BPSK) scheme, the symbol determination unit 153 determines 1 if the in-phase component of the signal output from the whitening filter unit 151 is greater than 0, and −1 if the in-phase component is smaller than 0. Alternatively, after the symbol determination, the symbol determination unit 153 may demodulate the bit sequence to perform error correction, and then output the symbol point after performing the mapping again.

Next, the symbol output from the symbol determination unit 153 or the known signal generation unit 154 passes through the regression filter unit 152 configured by an FIR filter, and thus a replica signal is reproduced. Here, when the reproduced replica signal is defined as a training signal d2, an error e2, which is a difference between the signal s and the training signal d2, is output to the post-weight calculation processing unit 155.

The post-weight calculation processing unit 155 updates the filter of the regression filter unit 152 so that the error e2 approaches zero. When the error e2 is minimized, the response of the regression filter unit 152 matches the impulse response being convoluted with the signal s. That is, when the error e2 is minimized, the impulse response in which a response of a propagation path is combined with a response of the adaptive array unit 14 matches a weighting factor in the regression filter unit 152.

By applying the whitening filter unit 151 calculated based on the response of the regression filter unit 152 to the signal s, the acoustic communication device according to the third embodiment can recover the symbol point even when the propagation path fluctuates. Since the weighting factor of the whitening filter unit 151 is adaptively updated, the acoustic communication device can follow fluctuations in the response of a short-delay multipath even when the response fluctuates.

Further, the configuration of the equalizer unit 15e according to the third embodiment can be applied to any of the equalizer units 15 according to the above-described first embodiment, the modified example of the first embodiment, the second embodiment, and the modified example of the second embodiment.

Further, in each of the embodiments described above, the hydrophones 10-1 to 10-N are designed to be provided in the acoustic communication device. However, the configuration is not limited thereto, and the hydrophones 10-1 to 10-N may be provided in an external device.

The acoustic communication device according to the above-described embodiments may be realized by a computer. In such a case, a program for realizing these functions may be recorded in a computer-readable recording medium to cause the program recorded in the recording medium to be read by a computer system and execute the program. Further, the "computer system" mentioned herein is assumed to include an OS and hardware such as a peripheral device. In addition, the "computer-readable recording medium" refers to a portable medium such as a flexible disk, a magneto-optical disk, a ROM, and a CD-ROM, and a storage device such as a hard disk built into a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. In addition, the above-described program may be a program for implementing a part of the above-mentioned functions, a program that can implement the above-described functions in a combination with another program already recorded in a computer system, or a program to be implemented with the use of a programmable logic device such as a field programmable gate array (FPGA).

REFERENCE SIGNS LIST 1 (1*b*, 1*c*, 1*d*) Acoustic communication device (communication apparatus)
10 (10-1 to 10-N) Hydrophone
11 (11-1 to 11-N) Channel estimation unit
12 (12-1, 12-N) Long-delay cutout unit
13 (13*b*, 13*b*-1, and 13*b*-2) Incoming direction estimation/weight determination unit
14 (14*b*, 14*b*-1, 14*b*-2, 14*c*, 14*d*, 14*d*-1, and 14*d*-2) Adaptive array unit
15 (15-1, 15-2, and 15*e*) Equalizer unit
16 (16-1, 16-2, 16*b*, 16*b*-1, and 16*b*-2) Symbol determination unit
21 Known signal generation unit
22 (22-1 to 22-N) Filter unit
23 Signal synthesizing unit
141 (141-1 to 141-N) Adaptive filter
142 Weight calculation processing unit
151 Whitening filter unit
152 Regression filter unit
153 Symbol determination unit
154 Known signal generation unit
155 Post-weight calculation processing unit

The invention claimed is:

1. A communication device comprising:
a processor; and
a storage medium having computer program instructions stored thereon, wherein the computer program instructions, when executed by the processor, perform to:
estimate an impulse response based on a signal of a sound wave received individually by a plurality of hydrophones;
remove a long-delay impulse response from the impulse response to generate a post-removal impulse response;
calculate a weighting factor based on the post-removal impulse response; and
synthesize the signal received by each of the plurality of hydrophones based on the weighting factor.

2. A communication device comprising:
a processor; and
a storage medium having computer program instructions stored thereon, wherein the computer program instructions, when executed by the processor, perform to:
filter a signal of a sound wave received individually by a plurality of hydrophones and synthesize the signals;
calculate, with a signal based on a known signal or an unknown signal as a training signal, an error between the signal and the training signal; and
update, based on the error, a weighting factor to be used in filtering.

3. The communication device according to claim 2, wherein the computer program instructions further perform to:
estimate an impulse response based on the signal;
remove a long-delay impulse response from the impulse response to generate a post-removal impulse response;
filter, based on the post-removal impulse response, the signal based on the known signal or the unknown signal; and
with a signal synthesized with the signal filtered as a training signal, a weighting factor to be used in.

4. The communication device according to claim 3, wherein the computer program instructions further perform to:
determine, based on the post-removal impulse response, an initial value of the weighting factor.

5. The communication device according to claim 2, wherein the computer program instructions further perform to:
equalize interference remaining after the filtering;
mitigate the residual interference; and
adaptively update, based on the signal based on the known signal or the unknown signal, a weighting factor.

6. The communication device according to claim 5, wherein the computer program instructions further perform to:
filter the signal based on the known signal or the unknown signal with a regression filter to reproduce a replica signal of the signal; and
adaptively update, with the replica signal as a training signal, a weighting factor.

7. A communication method comprising:
estimating an impulse response based on a signal of a sound wave received individually by a plurality of hydrophones;
removing a long-delay impulse response from the impulse response and generating a post-removal impulse response;
calculating a weighting factor based on the post-removal impulse response; and
synthesizing, based on the weighting factor, the signal received by each of the plurality of hydrophones.

8. A communication method comprising:
filtering a signal of a sound wave received individually by a plurality of hydrophones and synthesizing the signals; and calculating, with a signal based on a known signal or an unknown signal as a training signal, an error between the signal and the training signal and updating a weighting factor to be used in the filtering.

* * * * *